United States Patent [19]

Comert et al.

[11] Patent Number: 5,250,607
[45] Date of Patent: Oct. 5, 1993

[54] MOISTURE CURED ELASTOMERIC INTERPENETRATING NETWORK SEALANTS

[75] Inventors: Ahmet Comert, Chaineux; Michel Ladang, Herve; Dominique Petit, Housse-Blegny, all of Belgium

[73] Assignee: Norton Company, Worcester, Mass.

[21] Appl. No.: 468,408

[22] Filed: Jan. 22, 1990

Related U.S. Application Data

[63] Continuation-in-part of Ser. No. 140,851, Jan. 5, 1988.

[51] Int. Cl.$^5$ .............................................. C08L 27/06
[52] U.S. Cl. ................... 524/507; 525/129; 525/123; 525/100; 525/104; 525/903
[58] Field of Search .............. 525/92, 100, 101, 127, 525/129, 130, 104, 105, 106, 903; 524/506, 507

[56] References Cited

U.S. PATENT DOCUMENTS

| | | | |
|---|---|---|---|
| 3,642,936 | 2/1976 | Hodge | 525/101 |
| 3,979,547 | 9/1976 | Roberts et al. | 525/130 |
| 4,217,254 | 8/1980 | Legue | 525/130 |
| 4,302,553 | 11/1981 | Frisch et al. | 525/100 |
| 4,593,068 | 6/1986 | Hirose et al. | 525/100 |
| 4,775,719 | 10/1988 | Markevka et al. | 525/125 |
| 4,820,368 | 4/1989 | Markevaka et al. | 525/127 |
| 4,904,792 | 2/1990 | Iwahara et al. | 525/100 |

FOREIGN PATENT DOCUMENTS

| | | | |
|---|---|---|---|
| 56-062867 | 5/1981 | Japan . | |
| 56-149439 | 11/1981 | Japan . | |
| 63-017966 | 1/1988 | Japan | 525/100 |

*Primary Examiner*—Ralph H. Dean, Jr.
*Attorney, Agent, or Firm*—Arthur Loiselle, Jr.; Bruce F. Jacobs

[57] ABSTRACT

An interpenetrating polymer system prepared from a mixture of a moisture-cured prepolymer component and an elastomeric component which is non-reactive with the prepolymer component, wherein exposure of the mixture to ambient moisture cures the prepolymer component entrapping the elastomeric component and forming a product which is essentially thermoset. The product may be essentially non-foamed or highly foamed and and either tack-free or self-adhesive. It is particularly suitable for use as sealing gaskets, sheet stock, tubing, and as sealant-encapsulants.

6 Claims, No Drawings

MOISTURE CURED ELASTOMERIC INTERPENETRATING NETWORK SEALANTS

CROSS REFERENCE TO RELATED APPLICATION

This application is a continuation-in-part of U.S. Ser. No. 07/140,851, filed Jan. 5, 1988.

TECHNICAL FIELD

This invention relates to elastomeric interpenetrating networks produced from synthetic polymeric materials which networks are particularly suitable for use in hot melt sealant applications. The materials are moisture-curable, elastomeric and, depending upon specific composition, may be either tackfree or self-adhesive immediately upon extrusion. The elastomeric interpenetrating network flexible products are particularly useful as sealants, gaskets, and the like.

TECHNICAL BACKGROUND

The general possibility of polymer blends constituting interpenetrating polymer networks or IPN's has been known since 1969 in this field is summarized in the *Encyclopedia of Polymer Science and Technology*, Supplement Volume 1. The primary practical improvement obtained by the use of such IPN's has been increased toughness for plastics. However, no previous such compositions have been produced having the specific balance of properties required for use in the sealing and gasket operations as the present IPN's are directed.

A wide variety of natural and synthetic rubbers and other elastomers have previously been used for general sealing applications. For example, Japanese Appln. 59-213,786, teaches compositions comprising 100 parts by weight of urethane foam impregnated with 20-90 parts by weight of a mixture of a styrenebutadiene or styrene-isoprene block copolymer, bituminous material, an organic solvent, and optionally paraffinic or aromatic hydrocarbon oils, silicon water-repellents and/or defoaming agents, and inorganic fillers.

Japanese Appln. 58-215,334 discloses a "water-swelling sealant" comprising a rubber or plastic compound blended with a water-swelling polyurethane resin. The blend is mixed with an organic peroxide, molded or extruded to any desired shape, and then heated to 100°-200° C. to provide a water-swelling sealant.

Japanese Appln. 57-092,078 discloses a sealing material made by mixing a urethane polymer having a polydiene chain in the molecule and terminal isocyanate groups with an active hydrogen-containing compound and then curing the mixture by a urethane reaction to form the final elastomer.

U.S. Pat. No. 4,593,068 discloses a curing composition of a polyether having at least one reactive silicon-containing group in the molecule and an acrylate or methacrylate polymer. The product has substantial initial tackiness and is substantially non-elastomeric, even when large amounts of a plasticizer are added.

U.S. Pat. No. 3,642,936 discloses a non-extrudable, non-moldable coating composition for forming glossy vapor permeable finishes on natural leather and synthetic sheet material. Dissolved in a substantial amount of an organic solvent are an isocyanate-terminated polyurethane, a vinyl chloride polymer, and a reactive polysiloxane. The result is a useful flexible coating which is neither extrudable nor elastomeric.

It is an object of the present invention to produce compositions which, after hot-melt extrusion and before curing, (i) have sufficient melt strength to maintain the extruded shape in the substantial absence of sagging when extruded vertically, (ii) are alternatively initially tack-free or self-adhesive, and which, after curing by exposure to moisture, (iii) yields an elastomeric product which has an extremely low compression set, particularly at elevated temperature, and may be either foamed or essentially non-foamed.

SUMMARY OF THE INVENTION

It has now been found that certain novel compositions useful for producing interpenetrating polymer networks (IPN's) useful as a sealant or gasket may be produced by the proper blending of two substantially dissimilar polymeric components. The first is either an elastomer, preferably a plasticized elastomer, or a plasticized polyvinylchloride polymer. The second is a moisture-curable oligomeric prepolymer containing an average of two or more funtional terminal groups per molecule in which the functional groups are selected from isocyanate and substituted silane groups. The resultant compositions are extrudable and produce, after moisture curing, IPN's which are sufficiently elastomeric to be sealants or gaskets. Moreover, by the selection of starting materials the compositions can be tailored to have specific properties which make them particularly suitable for a variety of dissimilar sealant applications. For instance, they can be essentially tack-free immediately upon extrusion, thus making them useful as in-situ flexible gaskets which can be applied by robot machines. Alternatively, they can be formulated to possess sufficient initial tackiness to be self-adhesive, thereby making them desirable for use in totally different flexible gasket applications, i.e. to permanently or semi-permanently seal parts which do not mate completely. Moreover, both gasket types can be produced as either foamed or essentially non-foamed solid products.

DESCRIPTION OF THE PREFERRED EMBODIMENTS

The IPN's of the present invention are comprised of two primary ingredients, i.e. (i) an elastomer or a plasticized polyvinylchloride polymer and (ii) an oligomeric prepolymer having an average of two or more isocyanate or silane terminal groups.

The elastomer, which is preferably non-reactive with all other components in the composition, may be either a homopolymer or a copolymer. Examples of suitable homopolymers include: polybutylene, polyisobutylene, polysulfide, polyisoprene, polybutadiene, polyacrylate, and the like. Examples of suitable copolymers include: styrene-isoprene-styrene block copolymers, styrene-butadiene-styrene block copolymers, ethylene-propylene rubbers, polyethylene-acrylate, styrene-butadiene, styrene-isoprene, styrene-ethylene-butylene-styrene, ethylene-propylene-diene terpolymer rubbers, ethylene vinyl acetate, and the like. Preferably for producing tack-free initial extrudates the elastomer will be a styrene-butadiene-styrene block copolymer or a styrene-ethylene-butylene-styrene block copolymer, and most preferably a star block copolymer of either composition. Preferably when producing self-adhesive initial extrudates, the elastomer will be a polyisobutylene or styrene-isoprene-styrene block copolymer, and most preferably a star block copolymer.

A particularly preferred non-reactive elastomeric polymer for use in the initially tack-free embodiments of this invention is a styrene-butadiene-styrene block copolymer available as Cariflex TR-1102 from Shell Chemie, Wesseling, W. Germany. Cariflex TR-1102 has a density of 0.94 Mg/m$^3$ at 23° C.; a fluidity index of 6 g/10 min, measured by ASTM method D1238-65 T Condition "G"; a viscosity of 1200 centipoises as a 25% solution in toluene at 25.C., measured by Brookfield Viscometer Model LFV with spindle 3 at 6 rpm, a modulus of 2.9 MPa at 300% extension, and a Shore A (30 seconds) durometer value of 70. A particularly preferred polymer for use in self-adhesive formulations is Oppanol 100, a polyisobutylene homopolymer from BASF. Also preferred for self-adhesive formulations is Cariflex TR-1107, a styrene-isoprene-styrene block copolymer from Shell.

While the elastomers may be used in the absence of a plasticizing oil for a few very specific applications, the elastomer will most generally be blended with an amount of a plasticizing oil suitable for providing sufficient flexibility for the particular intended application. Plasticizing oils suitable for use with specific elastomers are those oils which are compatible with the elastomer, generally based upon a matching of the polarities of the materials, as is known. Generally the specific chemical composition of the oil will not be critical, provided that the oil is blendable with the elastomer in the amounts needed to produce the desired products with no substantial phase separation occurring. Thus, the oil may be paraffinic, naphthenic, aromatic, or a mixture thereof. Preferably, a mixture of oils having a high, i.e. above about 50%, paraffinic content is used for the preferred elastomers described above. A particularly suitable highly paraffinic oil for use with the preferred polymers is Enerpar 10, an oil available from BP Belgium, Antwerp, and having these typical characteristics: specific gravity of 0.874°at 15.5° C.; kinematic viscosity of 18.5 and 3.7 centistokes at 40°and 100° C.; 8% aromatic, 28% naphthenic, and 64% paraffinic carbon atoms; and containing about 65.3% saturates, 34.4% aromatics, and 0.3% polar compounds.

Generally the plasticizing oil will be used in an amount of about 50 to 250% of the weight of the elastomer. The specific amount utilized will generally depend upon the properties desired in the final cured extrudate as well as the viscosity of the composition before extrusion. For highly efficient mixing of the plasticized elastomer and the oligomeric prepolymer in low shear equipment, the viscosity of the two components should be reasonably similar, i.e. within about 50% at the same temperature. However, when using high shear mixing equipment there is no need to closely match the viscosities. Preferably, the plasticizing oil is present in an amount of at least the weight of the elastomer to provide the requisite flexibility to the moisture cured product. More preferably, the oil is used in an amount of about 120-200% of the elastomer weight.

A plasticized polyvinyl chloride (PVC) polymer may be used in place of the plasticized elastomer, due to its possessing similar flexibility characteristics. The plasticized PVC polymers useful herein include homopolymers as well as copolymers of vinyl chloride and conventional comonomers such as vinyl acetate. Suitable plasticizers for PVC are well known and all such PVC plasticizers may be utilized in this invention. Especially suitable plasticizers are the phthalates. The plasticized PVC should generally contain about 40 to about 250 parts plasticizer per 100 parts PVC polymer, preferably about 50 to about 150 parts. It should be noted that PVC plastisols containing about 300 or more parts plasticizer are not suitable for use herein because they would not produce normally extrudable compositions, an important feature of this invention.

The second primary component of the present interpenetrating networks is an oligomeric prepolymer having an average of two or slightly more, i.e. up to about 2.2, terminal functional groups per molecule which groups are reactive with each other in the presence of water, preferably atmospheric moisture. The functional groups are selected from isocyanate and substituted silane groups. The composition of the main body of the prepolymer is generally not critical, but rather will generally depend upon the intended use environment of the cured product. Thus the body of the prepolymer can be selected from polyester, polyether, polybutadiene, ethylene-vinyl acetate, ethylene-propylene-diene rubber or mixtures thereof. The prepolymer is conveniently prepared by reaction of one or more appropriate diols or diamines with suitable diisocyanates or disilanes wherein the alcohol or amine content is slightly less than the stoichiometric amount required for complete reaction. This results in the prepolymer possessing the requisite moisture-sensitive functional terminal groups.

The prepolymer needs to possess a number average molecular weight, as calculated by end group analysis, in the range of about 1,000 to 15,000, preferably about 2,500 to 10,000, and most preferably about 3,500 to 7,500, daltons to be useful herein. For mixing with low shear equipment the molecular weight of the prepolymer should generally be such that its viscosity is within about 50 to 200% of the viscosity of the elastomer composition with which it is blended. The necessary molecular weight can be obtained by selection of starting materials of the appropriate weights. Alternatively and preferrably, it is produced by chain extension of lower molecular weight oligomeric pre-polymers with a diol or diamine. While the chain extension may be performed in situ after blending of the lower molecular weight oligomeric prepolymer with the elastomer, it will more generally be performed before any such blending occurs, merely for ease of performing the chain extension reaction.

A preferred prepolymer component for use herein is made by reacting a polyester diol, Dynacoll RP 230, available from Dynamit Nobel Chemicals, with a polyether pre-polymer having residual isocyanate groups, Basonat PA 440, available from BASF Chemicals, in amounts which yield a ratio of isocyanate to hydroxyl of about 2.15. Dynacoll RP 230 has a glass transition temperature of −30° C., an OH number of 30 mg of KOH per gram, and a viscosity in Pa-sec of 40°at 60° C., 10°at 80° C., and 4 at 100° C. Basonat PA 440 has 11±1% isocyanate groups, a viscosity of 4.0±0.5 Pa-sec at 23° C., and a density of 1.09 Mg/m$^3$.

While the starting oligomeric pre-polymer may be prepared from conventional small diisocyanates or disilanes such as paraphenylene diisocyanate, trans-1, 4-cyclohexane diisocyanate, 3-isocyanato-methyl-3, 5, 5-trimethylcyclohexylisocyanate, diphenylmethane diisocyanate, and toluene diisocyanate, the residual presence of more than about 20 weight percent of such low molecular weight functional compounds in the final prepolymer is detrimental to the present invention because these compounds generally lead to products which are too hard for sealant or gasket use, even after substantially increasing the plasticizer content.

To the prepolymer or, more usually, the elastomer plus plasticizing oil composition, additional compounding materials beneficial for the specific use of the IPN are usually added. Examples of such materials include catalysts for accelerating the moisture reaction of the prepolymer, moisture transferring fillers and nucleating agents, dyes, surfactants or foam cell stabilizers for foamed products, drying agents to scavenge any water present when the mixture is to be stored before extrusion into the chosen final product shape, tackifying resins to improve the initial tack of self-adhesive compositions, and the like. Suitable catalysts include the conventional urethane or silane catalysts such as amines. Suitable fillers and nucleating agents for regulating the cell structure of foams include calcium carbonate, titanium dioxide, clay, and talc. Suitable surfactants or foam cell stabilizers for foamed products include the conventional silicone oils. Suitable drying agents include mono-isocyanates such as tosyl isocyanate which will tie up any trace water present in the other components to prevent premature reaction of the prepolymer therewith. Suitable tackifying resins which may be added to produce self-adhesive extrudates include aliphatic hydrocarbon resins having a softening point of about 150° C. or lower and aromatic resins (polymers of C8 cuts) or terpene-phenolic resins having a softening point of about 110°up to 200° C.

The elastomer and the oligomeric prepolymer are intimately blended to form the extrudable composition of this invention under conditions which will preclude exposure of the prepolymer to any substantial amount of water which could cause it to react therewith prematurely. Once the materials are blended, they will remain in an uncured state so long as they are not exposed to moisture or active compounds such as ammonia, primary or secondary amines. The blended composition is then ready to be extruded or otherwise molded, as opposed to being cast from solvent solutions, into the desired final shape. The extrusion or molding should be performed while protecting the extrudate from excessive exposure to moisture and active compounds so that it may be formed into the desired shape prior to any curing of the prepolymer. The curing entraps the elastomer within the prepolymer and thereby reduces/prevents its extractability therefrom. The resultant shaped article then is intentionally exposed to water, preferably in the form of ambient moisture, to cause reaction of the terminal groups to produce an elastomeric IPN structure having excellent resistance to environmental degradation. When an isocyanate group is present, it can react with water to form an amine which, upon reaction with a second isocyanate group, yields a substituted urea linkages. When substituted silane groups are present, they react with the water and form a siloxane linkage.

When the prepolymer to elastomer ratio is about 50:50 or above, the resulting extrudate is essentially thermoset. By "essentially thermoset" is meant that the composition will not melt and flow when exposed to heat and pressure, but may show some minor degree of softening. This is contrasted with a highly cross-linked thermoset polymer which exhibits no significant amount of softening under heat and pressure. The essentially thermoset products may exhibit some minor tendency to soften when heated, but they exhibit essentially no flow.

Prior to extrusion or molding, the blended materials may be stored as a single large mass in a covered container or in sealed plastic bags which are moisture-resistant. Alternatively, the blended materials may be stored in pellet form in moisture-resistant containers.

The compositions of the present invention can be fabricated into end products which are substantially foamed or essentially non-foamed. The foamed products are generally produced by extruding the compositions along with a suitable foaming agent, e.g. an inert gas such as nitrogen, or by using commercially available mixing equipment, such as disclosed in U.S. Pat. No. 4,405,063, for that purpose. With isocyanate terminal groups on the prepolymer, some amount of natural foaming occurs due to the first step of the curing reaction between the isocyanate group with water:

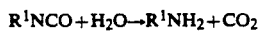

$$R^1NCO + H_2O \rightarrow R^1NH_2 + CO_2$$

which generates a primary amine and carbon dioxide gas. If the reaction with water (or another active compound which will generate a gas in situ) is rapid, due to the temperature or amount of moisture or low viscosity of the composition prior to extrusion, then there can be a surge of relatively large bubbles which will produce a somewhat foamed product. If the reaction is slow, however, then at most only small individual bubbles will be generated which will produce only slight very fine porosity and the product will have the physical properties of an essentially unfoamed material. When an isocyanate-terminated prepolymer is used, the end product will always have some degree of cell formation or porosity. If the prepolymer cures through silane groups, then no foaming will occur in the absence of chemical means or special equipment. Both low foam and no foam cured materials are referred to herein as "essentially non-foamed."

In addition to temperature, relative humidity, and viscosity, the total amount of crosslinkable isocyanate or silane groups present and the thickness of the piece being fabricated help determine the properties of the final cured product. An extruded sheet 0.5 mm thick based upon a composition containing 1.24% free isocyanate groups has been found to fully cure in boiling water within 5 minutes while a 12 mm thick piece fully cures in 3 weeks of exposure to 35-60% relative humidity at room temperature. To produce the IPN's of this invention, the minimum amount of free isocyanate or silane functional groups needs to be at least about 0.1%, preferably at least about 0.5 and most preferably at least about 1%, by weight to produce final cured products useful as gaskets having sufficient temperature and solvent resistance.

The isocyanate groups of the initial extrudates after reaction with moisture yield primary amines which, upon reaction follows:

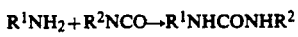

$$R^1NH_2 + R^2NCO \rightarrow R^1NHCONHR^2$$

in which each of the hydrogen atoms is reactive towards further isocyanate groups, albeit relatively slowly, and thus able to form a crosslinked structure which serves to hold the elastomeric polymer such that it becomes unextractable. Furthermore, even if further reaction of one or both of the hydrogen atoms does not occur, the urea groups of two different molecules are sufficiently attractive towards each other to accomplish essentially the same result of binding the elastomer and making it unextractable.

When substituted silane groups of the formula R—Si(X)$_3$ wherein R is the body of the prepolymer and X is selected from such as halo, C$_{1-4}$ alkoxy, amine, acetate, and oxime, are present on the prepolymer component, two of such groups from different molecules can be linked by the presence of the moisture to form a siloxane linkage —(Si—O—Si)— and release 2 moles of HX per mole of water reacted.

In addition to sheet material or tapes, other commercial products such as tubing may be fabricated from the compositions of the invention. Especially suitable products are sealing gaskets for drum covers and sealant-encapsulants around electrical connectors.

The compositions of the present invention are particularly adapted for use in place of conventional hot melt adhesives (especially when tack-free upon initial extrusion) and as a double-sided adhesive tape (when self-adhesive before cure). When the uncured extrudate is in place, atmospheric moisture cures the prepolymer component of the mixture resulting in a flexible adhesive joint with its attendant advantages over the more conventional hot melt adhesives and mounting tapes.

To produce hot melt gaskets suitable for application by robot machines, it has been found especially convenient to (i) form a "master batch" containing the elastomer, a plasticizing oil therefor, a filler such as calcium carbonate, a dye, a foam cell stabilizing silicone oil, and optionally a conventional NCO-reaction accelerating amine catalyst; (ii) form an isocyanate-terminated prepolymer having a molecular weight of about 1,000 to 15,000 daltons; (iii) blend the master batch, the prepolymer, and a mono-isocyanate drying agent in the substantial absence of exposure to water; (iv) heat the blend to an elevated temperature and (v) extrude the blend to generate a solvent-free one component gasket product. Various alternatives to the procedure include: (a) adding a gaseous blowing agent to the blend being extruded to form a foamed product; (b) collecting the blend after step (iii) and storing it in a moisture-free environment, preferably as pellets; and (c) essentially simultaneously performing steps (iii) and (iv) with such as a twin screw extruder.

To be considered useful in accordance with the present invention as a sealant or gasket, the blended composition which is extruded or molded, i.e. before any cure, must possess (i) a melt strength of about 0.3 to 10 Newton-meters (N·m), preferably about 0.4 to 4 N·m, and most preferably about 0.5 to 3 N·m; (ii) be visually homogeneous. When the melt strength is less than about 0.3 N·m, the material generally cannot be extruded into place in a vertical direction. When the melt strength is above 10 N—m, premature crosslinking is likely to occur. When the melt strength is above about 4 and less than about 10 N·m, the melt strength is generally too high for processing through the preferred foam mix machine of U.S. Pat. No. 4,405,063 but may be processed with other equipment.

To be considered useful as a sealant or gasket in accordance with the present invention, a resultant cured IPN must exhibit (i) an elastic modulus at 30% elongation of at most about 3,000 psi, preferably at most about 2,700 psi, and most preferably at most about 2,500 psi, (ii) an elongation at break of at least about 100%, preferably at least about 150%, and most preferably at least about 200%, (iii) a compression set at the projected temperature of use of the sealant of less than about 30%, preferably less than about 20%, and most preferably less than about 10%; and (iv) a hardness, in a foamed version with a 50% blowing ratio, of less than about 90 Shore OO, preferably less than about 80 Shore OO, and most preferably less than about 65 Shore OO, or a hardness in the non-foamed version of less than about 90 Shore A, preferably less than about 80 Shore A, and most preferably less than about 65 Shore A. Preferably, the cured IPN will also possess a compression set at room temperature of less than about 1%, preferably 0.

The following non-limiting examples are presented to better explain the present invention. All parts and percents are by weight unless otherwise specified.

EXAMPLE 1

A sealant tape which was tack-free immediately upon extrusion was produced with a composition of the invention. The composition contained: (i) a master batch of 1000 parts Cariflex 1102 block styrene-butadiene-styrene copolymer, 1600 parts Enerpar 10 plasticizing oil, 50 parts titanium dioxide pigment, 1000 parts finely powdered calcium carbonate filler, 50 parts Irganox 1520 phenolic antioxidant from Ciba Geigy, and 5 parts benzoyl chloride urethane catalyst; and (ii) a prepolymer prepared from 6000 parts Dynacoll RP 230 polyester diol, and 3268 parts Basonat PA 440 isocyanate-terminated polyether oligomer.

The product was made in three steps, i.e. the master batch and the prepolymer were separately prepared and then the two were blended, each using a vacuum type kneader mixer provided with two counter rotating Z shaped blades that were capable of thoroughly mixing even viscous elastomers with one another. Steam jacketing of the mixing space allowed control of the temperature of the mixture between about 60° and 160° C. by regulation of the steam pressure.

To prepare the pre-polymer, the temperature in the mixer was held at about 100° C. 35.6 kg of Dynacoll RP 230 was placed in it and a vacuum of −0.6 bar was applied for 30 minutes to remove any residual moisture present in the polyester diol. The vacuum was terminated and 19.4 kg of Basonat PA 440 polyether prepolymer was added at one time. Mixing and reaction whereby the diol chain extended the pre-polymer increasing its molecular weight and viscosity continued for about 3 hours while the mixer chamber was purged with nitrogen. The chain extended prepolymer had a molecular weight as determined by end group analysis of about 5,200 daltons. It was unloaded and stored at room temperature in a moisture-free environment in silicone coated containers.

The master batch was prepared after thorough cleaning of the mixer and preheating it to 160° C. 4.1 kg of Cariflex 1102, 2 kg of titanium dioxide, 0.2 kg Irganox 1520, 4.1 kg of calcium carbonate, and 1 kg of Enerpar 10 were added to the mixer and blended until a homogeneity occurred. To reduce the viscosity to more closely match the viscosity of the prepolymer of above incremental quantities of 1.6, 2, and 2 kg of Enerpar 10 oil were added, with mixing after each increment. When the viscosity was reduced to a similar level as determined by visual observation, 0.02 kg of benzoyl chloride was added and the entire batch mixed for an additional 10 minutes.

The master batch could then have been stored in like manner to the prepolymer, but in this case the temperature was reduced to 100° C. and 38 kg of the prepolymer composition of above was added along with 5 parts of tosyl isocyanate moisture scavenger and mixed for 30 minutes. After completion of mixing, the composition was unloaded, while still hot enough to readily flow through the screw fitting at the bottom of the mixer chamber into drums filled with carbon dioxide to protect the composition from contact with atmospheric moisture. The upper surface of the composition in the drum was covered with a silicone coated polyester protective film and a humidity absorber pack was place atop the protective film within the drum. The drum was then covered with a tight cover for storage and/or shipping.

To make a tape from the composition so prepared, it was extruded through a screw extruder between two silicone coated polyester films and flattened to a thickness of 1 mm. The flattened extrudate without the protective film was then exposed to 100% relative humidity in air in a controlled humidity chamber at 60° C. for two hours. The cured and foamed tape was suitable for direct use as a sealant. It was tack-free immediately upon extrusion. Some physical properties are shown in Table I.

TABLE I

CHARACTERISTICS OF SEALANT TAPE PRODUCT FROM EXAMPLE 1

| | |
|---|---|
| Density: | 529 kg/m$^3$ |
| Force to compress by 30%: | 77 kPa |
| Tensile strength: | 480 kPa |
| Elongation at break: | 276% |
| Weight % unextractable in boiling toluene for 1 hour: | 92 |

| | −20° C. | 23° C. | 50° C. | 70° C. |
|---|---|---|---|---|
| Compression set at: | 0% | 0% | 11.5% | 17% |

| Adherend | Peel Adhesion of Tape at 23° C., N/cm |
|---|---|
| Polypropylene | 0.2 |
| ABS | 2.5 |
| Polyvinylchloride | 12.5 |
| Polyurethane | >15.0 |
| Aluminum | 2.5 |
| Polyethylene | 4.5 |
| Polyamide | 0.5 |
| Polystryrene | 0.3 |
| Polycarbonate | 15.0 |

The 0% compression set at room temperature is particularly outstanding and useful. For comparison, the compression set of four commercially available sealant foams are shown in Table II in which the Fermapor products are produced by Sonderhoff GmbH of W. Germany.

TABLE II

COMPRESSION SET VALUES FOR SOME COMPARATIVE SEALANTS

| | Percent Compression Set at: | |
|---|---|---|
| Sealant Type | 23° C. | 70° C. |
| Ethylene-propylene-diene monomer foam | 14 | 40.0 |
| Fermapor K31-2440-RFB | 10 | 45.0 |
| Fermapor K31-2200-RFB | 9 | 15.5 |
| Fermapor K31-2100-RFB | 2 | 14.5 |

EXAMPLE

The basic procedure of Example 1 was repeated to produce a self-adhesive extrudate except varying the initial components, i.e. eliminating the plasticizing oil and other components of the master batch. For this example, Cariflex TR 1107, a styrene-isoprene-styrene block copolymer, was used. Some typical properties of Cariflex TR 1107 are: a density of 0.92 Mg/m$^3$ at 23° C.; a fluidity index of 9 g/10 min; a solution viscosity of 1600 cps; a styrene/isoprene ratio of 14/86; a modulus of rupture of 28 MPa with 1300% extension; and a Shore A durometer value of 30. Also, Dynacoll RP 220 was used in place of the similar Dynacoll RP 230. Dynacoll RP 220 has a glass transition temperature of −20° C., a viscosity of 110, 25, and 7 Pa sec at 60, 80, and 100° C., but otherwise is very similar to Dynacoll RP 230.

A composition of 100 parts Cariflex TR 1107, 100 parts Escorez 1304 tackifying resin from Exxon Chemical Co., 50 parts Dynacoll RP 220, and 21.2 parts Basonat PA 440 was blended in two stages. First the latter two components were mixed and allowed to react with each other to form the prepolymer. Then the prepolymer was blended with the Cariflex and the Escorez in the absence of the other components of the master batch. The composition exhibited 76% unextractables after curing for one hour in boiling water. When allowed to cure spontaneously by exposure to atmospheric moisture, the composition was a useful gasket/seal exhibiting physical properties essentially the same as those of Example 1.

EXAMPLES 3 and 4

The procedure of Example 1 was repeated to produce a self-adhesive IPN according to the teachings of this invention. To do so, the Cariflex materials of Examples 1 and 2 were replaced by polyisobutylene rubbers. The composition for Example 3 used 100 parts Oppanol 100 and Example 4 used 100 parts Oppanol 15, both polyisobutylene rubbers of BASF. The remainder of both compositions contained 50 parts Dynacoll RP 220 and 21.1 parts Basonat PA 440. The materials were mixed and cured by an accelerated procedure with boiling water for one hour. The unextractables were 87% for Example 3 and 66% for Example 4. The compositions as extruded were self-adhesive, readily adhering to painted panels supplied by the automobile industry. The degree of self-adhesion was determined by peel adhesion tests and found to be excellent.

EXAMPLE 5

The procedure of Example 1 was repeated except that the urethane terminal groups on the prepolymer were converted to substituted silane groups prior to blending with the plasticized elastomer in the absence of other master batch ingredients. The complete formulation was 100 parts Cariflex 1102, 50 parts Dynacoll RP 220, 21.2 parts Basonat PA 440, and 5.8 parts 3-mercaptopropyltrimethoxysilane: $HS(CH_2)_3Si(OCH_3)_3$. The Dynacoll and Basonat were first allowed to react with each other to produce a prepolymer with isocyanate end groups. The prepolymer was then reacted with the mercaptosilane to react the isocyanate end groups with the mercapto groups of the silane to convert the end groups to trimethoxysilyl groups. Reaction of these groups with water during the curing of the resultant prepolymer hydrolyzes the methoxy parts of the end groups to hydroxy, and then the resultant trihydroxysilyl groups react with each-other to form the final siloxane linkages.

After curing by immersion in boiling water for one hour, 75% of this composition was unextractable by boiling toluene in one hour. The unextractability level is an indirect measure of the crosslinking produced because Cariflex 1102 would have been extractable but for its becoming tied up by the curing of the prepolymer, i.e. only 43% of the composition would have been unextractable if no crosslinked IPN had been formed, but 75% was found to be unextractable.

EXAMPLE 6

To demonstrate the variability of the compositions which can be produced in accordance with the present invention, multiple compositions were prepared containing Cariflex TR-1102, a styrene-butadiene-styrene block copolymer, as the elastomer; a pre-polymer component made by reaction of Dynacoll RP 230, a polyester diol, with Basonat PA 440, a polyether pre-polymer having terminal isocyanate groups, wherein they are reacted in amounts which yield a ratio of isocyanate to hydroxyl of about 2.15; and Enerpar 10, a paraffinic oil as the plasticizer for the elastomer. Table III shows the proportions of the components and the amount of unextractable material from the respective cured compositions. While only the weight of Dynacoll RP 230 is reported, the actual compositions contained Basonat PA 440 in an amount of (2.15)(368)/(1870) times the weight of Dynacoll (368 being the equivalent weight per NCO group in Basonat and 1870 the equivalent weight per OH group in Dynacoll).

The amount of unextractable material shown in Table III was determined as follows: the cured sample was submerged in boiling water for one hour to assure complete moisture stimulated curing. A precisely weighed portion of the cured material was placed in a 200 mesh screen container and suspended in a boiler having a rapid flow of refluxing toluene forced through the screen and over the sample. After one hour, the sample was removed from the container, the toluene removed from the sample by heating, the sample weighed, and the percent unextracted material calculated.

Cured compositions with good resistance to high temperature and solvents were obtained from all compositions in Table III which showed 50% or more unextractables. When the amount of unextractable material in a particular cured composition exceeds the amount of Dynacoll and Basonat contained in that composition, an IPN is formed by that composition after cure.

TABLE III

| Sample | Weight % of Composition | | | Wt % Unextractable | Torque |
|---|---|---|---|---|---|
| | Cariflex | Dynacoll | Enerpar | | |
| A | 17.5 | 17.5 | 65.0 | 8 | 0 |
| B | 10.0 | 35.0 | 55.0 | —.** | 0 |
| C | 40.0 | 10.0 | 50.0 | 4 | 0.6 |
| D | 25.0 | 25.0 | 50.0 | 49 | 0 |
| E | 0.0 | 50.0 | 50.0 | 80.** | — |
| F | 15.0 | 42.5 | 42.5 | 43 | 0 |
| G | 24.0 | 36.0 | 40.0 | 6 | — |
| H | 15.0 | 50.0 | 35.0 | 60 | 0.1 |
| I | 33.3 | 33.3 | 33.3 | 50 | 0.34 |
| J | 65.0 | 10.0 | 25.0 | 12 | 3.2 |
| K | 50.0 | 25.0 | 25.0 | 43 | 0.95 |
| L | 25.0 | 50.0 | 25.0 | 65 | 0.2 |
| M | 10.0 | 65.0 | 25.0 | 81 | 0.2 |
| N | 0.0 | 75.0 | 25.0 | 88 | 0 |
| O | 66.0 | 17.0 | 17.0 | 58 | 2.6 |
| P | 42.0 | 42.0 | 16.0 | 52 | 0.6 |
| Q | 33.0 | 50.0 | 17.0 | 60 | 0.95 |
| R | 17.0 | 66.0 | 17.0 | 24 | 0.48 |
| S | 60.0 | 27.0 | 13.0 | 42 | 1.8 |
| T | 10.0 | 80.0 | 10.0 | 90 | 0 |
| U | 85.0 | 7.5 | 7.5 | 3 | 6.3 |
| V | 80.0 | 20.0 | 0.0 | 54 | 4.5 |
| W | 65.0 | 35.0 | 0.0 | 82 | 4 |

TABLE III-continued

| Sample | Weight % of Composition | | | Wt % Unextractable | Torque |
|---|---|---|---|---|---|
| | Cariflex | Dynacoll | Enerpar | | |
| X | 50.0 | 50.0 | 0.0 | 77.** | 1.06 |

.**indicates incompatibility of blend observed
— indicates no measurement made

Composition M from Table III may be taken as a typical example of an IPN composition. Its complete composition in parts by weight was 100 parts Cariflex, 250 parts Enerpar, 650 parts Dynacoll, and 275 parts Basonat. A 1 mm thick sheet was extruded and cured under typical conditions of use, i.e. at 23° C. and 44% relative humidity in static air, rather than the boiling in water. The results are shown indicated in Table IV. The % unextractable was measured as in Table III.

TABLE IV

| KINETICS OF MOISTURE STIMULATED CURE OF SAMPLE M | |
|---|---|
| Time of Exposure to Moist Air | Weight % Unextractable |
| None | 0 |
| 16 hours | 12 |
| 23 hours | 16 |
| 42 hours | 62 |
| 66 hours | 64 |
| 144 hours | 70 |

However, composition M has too low a melt strength for the preferred use as a sealant. Thus of the twenty-four compositions, while eleven produced IPN's based upon the level of unextractables, only six, i.e. samples I, O, P, Q, V, and W, had a sufficiently high melt strength to be particularly useful as a sealant/gasket. Those compositions which exhibited too low a melt strength for sealant use can be modified by the inclusion of suitable fillers to increase the melt strength and make them useful as such.

EXAMPLE 7

The procedure of Example 1 was repeated except utilizing plasticized polyvinylchloride in place of the plasticized elastomer. The level of plasticizer for the PVC was varied from 0 to 70 parts per 100 parts of PVC. The PVC used was Solvic 374 MB from Solvic SA, Brussels, Belgium, the plasticizer was diisooctylphthalate (DIOP), and the pre-polymer was as in Example 1. The masterbatch did not contain any of the secondary ingredients except for a urethane catalyst [A99 which is bis(2-dimethylaminoethyl)ether]in an amount of 3 parts. The specific compositions produced and the physical properties of the resultant extrudates are given in Table V.

TABLE V

| USE OF PVC IN PLACE OF ELASTOMER | | | | |
|---|---|---|---|---|
| Ingredients (parts) | A | B | C | D |
| Polyvinyl chloride | 100 | 100 | 100 | 100 |
| DIOP plasticizer | 0 | 20 | 50 | 70 |
| Catalyst | 3 | 3 | 3 | 3 |
| Pre-polymer | 100 | 100 | 100 | 100 |
| Properties | | | | |
| Hardness, Shore A | 84 | 65 | 62 | 45 |
| Tensile Strength at break, psi | 1460 | 1325 | 1225 | 590 |
| Elongation at Break, % | 150 | 285 | 400 | 445 |
| Elastic Modulus, at 30% elongation, psi | 2130 | 1035 | 485 | 240 |

As can be seen from the results, PVC containing little or no plasticizer does not produce suitable compositions for use in the present invention due to the product being too hard, i.e. the elastic modulus was too high and the elongation at break too low. However, when the plasticizer level was at 50 or 70 parts per 100 parts of PVC, a good balance of properties resulted.

EXAMPLE 8

The procedure of Example 1 was repeated with a different formulation containing a star block copolymer as the elastomer. The composition contained: (i) a master batch of 100 parts Sol T 163 star block styrene-butadiene-styrene copolymer available from Enichem, 160 parts Enerpar 10 plasticizing oil, 5 parts carbon black pigment, 100 parts finely powdered calcium carbonate filler, and 13 parts Polyurax SR 301 silicone oil; and (ii) a pre-polymer having a molecular weight of about 5,000 daltons prepared from 612 parts Dynacoll RP 230 polyester diol, and 288 parts Basonat PA 440 isocyanate-terminated polyether oligomer.

The composition was processed as in Example 1 and extruded so as to minimize foam and porosity generation. Extrusion was onto a part having both horizontal and vertical sections. No sagging of the verticle extrudate was observed.

The resultant unfoamed product, which had essentially no residual tack after extrusion, was found to have the properties after cure by exposure to atmospheric moisture for 48 hours as shown in Table VI.

TABLE VI

| Results of Example 8 | |
|---|---|
| Property | Result |
| Density | 900 kg/m$^3$ |
| Tensile Strength | 236 N/cm$^2$ |
| Elongation at break | 600% |
| Modulus at 30% elongation | 130 N/cm$^2$ |
| Compression Set | |
| 23° C. | 0% |
| 50° C. | 0% |
| 70° C. | 7% |

EXAMPLE 9

The procedure of Example 8 is repeated with a series of compositions to evaluate the Brabender torque (at 100° C.) which serves to indicate the melt viscosity and thus is an indication of the melt strength and the compression set of moisture cured extrudates at room temperature, 50° C. and 70° C. The amount of the prepolymer of Dynacoll RP 230 and Basonat PA 440 was varied as indicated while holding the other ingredients constant. The compositions and results were as shown in Table VII.

TABLE VII

| Compositions and Results of Example 9 | | | | | | | |
|---|---|---|---|---|---|---|---|
| Sol T 163 | 100 | 100 | 100 | 100 | 100 | 100 | 100 |
| Enerpar 10 | 160 | 160 | 160 | 160 | 160 | 160 | 160 |
| CaCO$_3$ | 100 | 100 | 100 | 100 | 100 | 100 | 100 |
| Pigment | 5 | 5 | 5 | 5 | 5 | 5 | 5 |
| Dynacoll 230 | 204 | 272 | 340 | 408 | 476 | 544 | 612 |
| Basonat 440 | 96 | 128 | 160 | 192 | 224 | 256 | 288 |
| Torque | 0.7 | 0.9 | 0.9 | 0.9 | 0.95 | 0.95 | 0.85 |
| Compression Set | | | | | | | |
| R.T. | 17 | 17 | 0 | 0 | 0 | 0 | 0 |
| 50° C. | 67 | 67 | 17 | 0 | 0 | 0 | 0 |
| 70° C. | 75 | 83 | 58 | 8 | 29 | 19 | 7 |

These results show that when the prepolymer content is more than about 58% for this combination, a superior high temperature compression set product is produced. The compression set is particularly important for those sealants which are to be used as gap fillers since it is a measure of the resiliency of the sealant and thus the life expectancy of the sealant.

What is claimed is:

1. An extrudable thermoplastic composition of matter comprising an intimate mixture of:
   (a) a first component which is a prepolymer having a number average molecular weight of about 1,000 to about 15,000, a backbone and an average of about 2 terminal isocyanate groups which are reactive with each other in the presence of ambient moisture to form a derivative polymer having a longer average chain length than said prepolymer:
   (b) a second component which is a plasticized polyvinylchloride polymer which is non-chemically reactive with itself and with said first component in the presence or absence of moisture,
   wherein said composition of matter after cure by exposure to moisture forms an elastomeric interpenetrating network.

2. The composition of claim 1, wherein immediately after extrusion it is self-adhesive.

3. The composition of claim 1, wherein said first component has a backbone selected from polyester, polyether, polybutadiene, or mixtures thereof.

4. The composition of claim 1, wherein before cure it exhibits a melt strength of about 0.5 to about 3 N·m and is visually homogeneous, and after complete cure by exposure to atmospheric moisture it exhibits a tensile strength of at least 200 N/cm$^2$, an elastic modulus at 30% elongation of less than about 2,500 psi, an elongation at break of at least about 200%, and a compression set of not more than 1% at 23° C. and at 50° C.

5. A sealing gasket for a drum cover comprising the cured composition of claim 1.

6. The composition of claim 1, having up to about 2.2 terminal isocyanate groups.

* * * * *